US012060902B2

(12) United States Patent
Lee et al.

(10) Patent No.: US 12,060,902 B2
(45) Date of Patent: Aug. 13, 2024

(54) TOILET MOUNTED MANAGEMENT DEVICE (71) Applicant: Kohler Co., Kohler, WI (US)

(72) Inventors: Dongha Lee, Sheboygan, WI (US); Kiki Wang, Kohler, WI (US)

(73) Assignee: Kohler Co., Kohler, WI (US)

( * ) Notice: Subject to any disclaimer, the term of this patent is extended or adjusted under 35 U.S.C. 154(b) by 259 days.

(21) Appl. No.: 17/513,520

(22) Filed: Oct. 28, 2021

(65) Prior Publication Data

US 2022/0136537 A1 May 5, 2022

Related U.S. Application Data (60) Provisional application No. 63/110,155, filed on Nov. 5, 2020.

(51) Int. Cl.
*F16B 2/22* (2006.01)
*E03D 9/08* (2006.01)

(52) U.S. Cl.
CPC ............... *F16B 2/22* (2013.01); *E03D 9/085* (2013.01)

(58) Field of Classification Search
CPC .......................................................... F16B 2/22
USPC ....................................................... 248/311.2
See application file for complete search history.

(56) References Cited

U.S. PATENT DOCUMENTS

| 4,991,801 A * | 2/1991 | Trumbull | F16L 3/221 248/62 |
| 4,998,300 A | 3/1991 | Sharifzadeh | |
| 6,167,577 B1 | 1/2001 | Hammad | |
| 6,408,492 B1 * | 6/2002 | Sparks | A01K 97/08 24/336 |
| 6,941,590 B2 * | 9/2005 | Lim | E03D 9/085 4/443 |
| 7,127,750 B2 | 10/2006 | Lim | |
| 7,891,614 B2 * | 2/2011 | Czajor | F16L 3/003 242/405 |
| D761,644 S * | 7/2016 | Papafagos | D8/396 |
| 9,856,637 B2 * | 1/2018 | Kontogounis | E03D 9/08 |
| 10,202,994 B2 * | 2/2019 | Andrus | F16B 11/006 |
| 2011/0088153 A1 * | 4/2011 | Richard | B05B 1/20 4/223 |

FOREIGN PATENT DOCUMENTS

| CN | 205065041 U | 3/2016 |
| CN | 105090619 B | 3/2018 |
| CN | 109058594 A | 12/2018 |
| EP | 0733842 B1 | 2/1999 |
| EP | 2112113 A1 | 10/2009 |
| JP | H10121550 A | 5/1998 |
| JP | 2823148 B2 | 11/1998 |
| JP | 3591485 B2 | 9/2004 |

* cited by examiner

*Primary Examiner* — Christine J Skubinna
(74) *Attorney, Agent, or Firm* — Lempia Summerfield Katz LLC (57) ABSTRACT

An accessory management device for a toilet accessory is disclosed. The accessory management device includes a mounting hole configured to receive a fastener, a first clip section configured to hold an electrical cord for supply power to the toilet accessory, a second clip section configured to hold a first portion of a water hose for providing water to a toilet accessory, and a body portion having a storage section to store a second portion of the water hose.

20 Claims, 8 Drawing Sheets

TOILET MOUNTED MANAGEMENT DEVICE

CROSS-REFERENCE TO RELATED APPLICATIONS

This application claims priority benefit of Provisional Application No. 63/110,155 filed on Nov. 5, 2020, which is hereby incorporated by reference in its entirety.

FIELD

This disclosure relates in general to toilet accessories, and more specifically, to an accessory management device for a toilet accessory.

BACKGROUND

A sanitation device such as a bidet or a hand sprayer may be mounted to any toilet. Such after market installations however may result in poor organization or aesthetics related to the electrical wiring and plumbing connections necessary for operation of the bidet or hand sprayer.

BRIEF DESCRIPTION OF THE DRAWINGS

Objects, features, and advantages of the present disclosure should become more apparent upon reading the following detailed description in conjunction with the figures, in which.

DETAILED DESCRIPTION

Before turning to the figures, which illustrate certain exemplary embodiments in detail, it should be understood that the present disclosure is not limited to the details and methodology set forth in the detailed description or illustrated in the figures. It should be understood that the terminology used herein is for the purpose of description only and should not be regarded as limiting.

Referring generally to the figures, disclosed herein is a management device for a toilet accessory and a method for installing a management device for a toilet accessory.

Figure 1A:
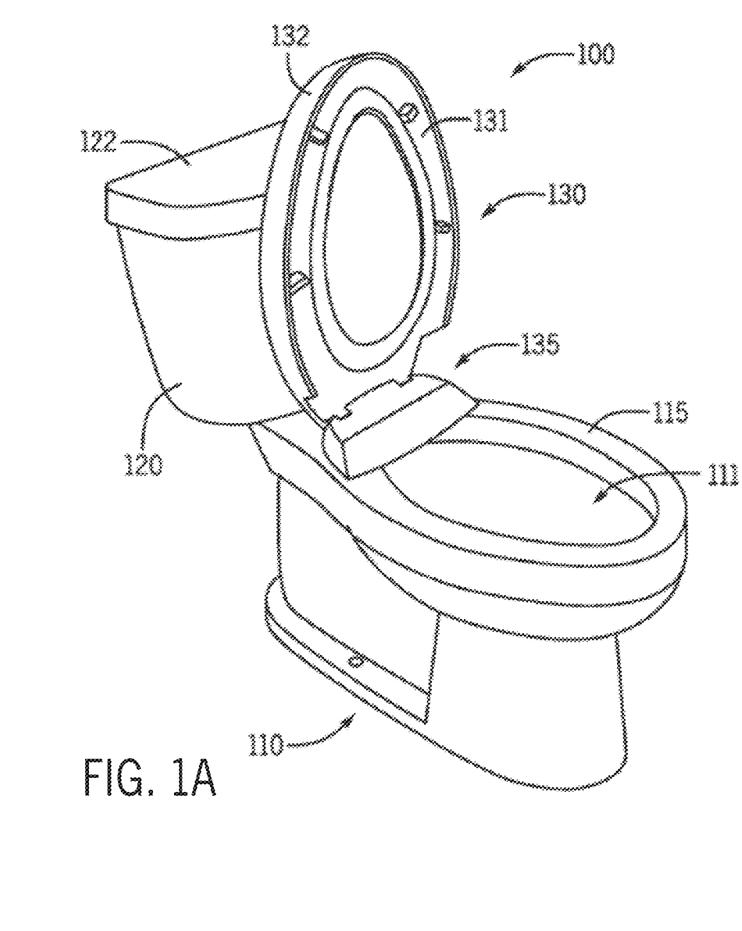
FIG. 1A illustrates perspective views of a toilet to which a toilet accessory and the management device for a toilet accessory may be attached.
Figure 1B:
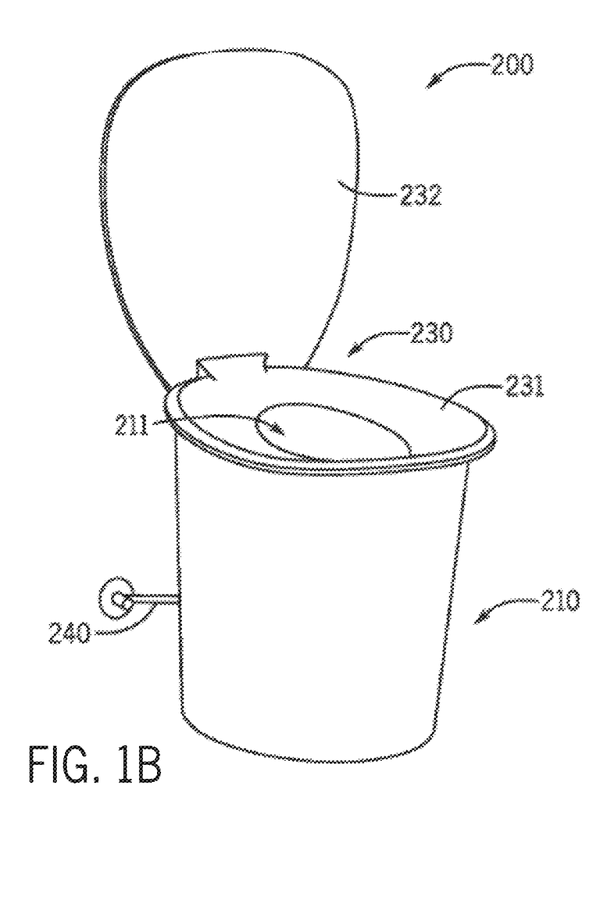
FIG. 1B illustrates perspective views of a tankless toilet to which a toilet accessory and the management device for a toilet accessory may be attached.

FIGS. 1A and 1B illustrate perspective views of toilets to which a toilet accessory and the toilet management device as disclosed herein may be attached. Specifically, FIG. 1A illustrates a toilet 100 including a tank 120. FIG. 1B illustrates a tankless toilet 200. Additional, different, or fewer components may be included.

Referring to FIG. 1A, a toilet 100 including a base 110 (e.g., a pedestal, bowl, etc.) and a tank 120 is shown. The base 110 is configured to be attached to another object such as a drainpipe, floor, or another suitable object. The base includes a bowl 111, a sump (e.g., a receptacle) disposed below the bowl 111, and a trapway fluidly connecting the bowl 111 to a drainpipe or sewage line. The tank may be supported by a base 110, such as an upper surface of a rim 115. The tank 120 may be integrally formed with the base 110. In other embodiments, the tank 120 may be formed separately from the base 110 and coupled (e.g., attached, secured, fastened, etc.) to the base 110. The toilet 100 may further include a tank lid 122 covering an opening and inner cavity in the tank 120. The toilet 100 may include a seat assembly 130 including a seat 131 and a seat cover 132 rotatably coupled to the base 110. The toilet 100 may further include a hinge assembly 135.

Referring to FIG. 1B, a tankless toilet 200 is shown. The toilet 200 includes a base 210 and a seat assembly 230 coupled to the base. The seat assembly 230 includes a seat 231 and a cover 232. The base 210 includes a bowl 211, a sump disposed below the bowl 211, and a trapway fluidly connecting the bowl 211 to a drainpipe or sewage line. The toilet 200 includes a waterline 240 that supplies the toilet 200 with water.

The toilets 100 and 200 of FIGS. 1A and 1B are provided herein as non-limiting examples of toilets that may be configured to utilize aspects of the present disclosure.

Figure 2:
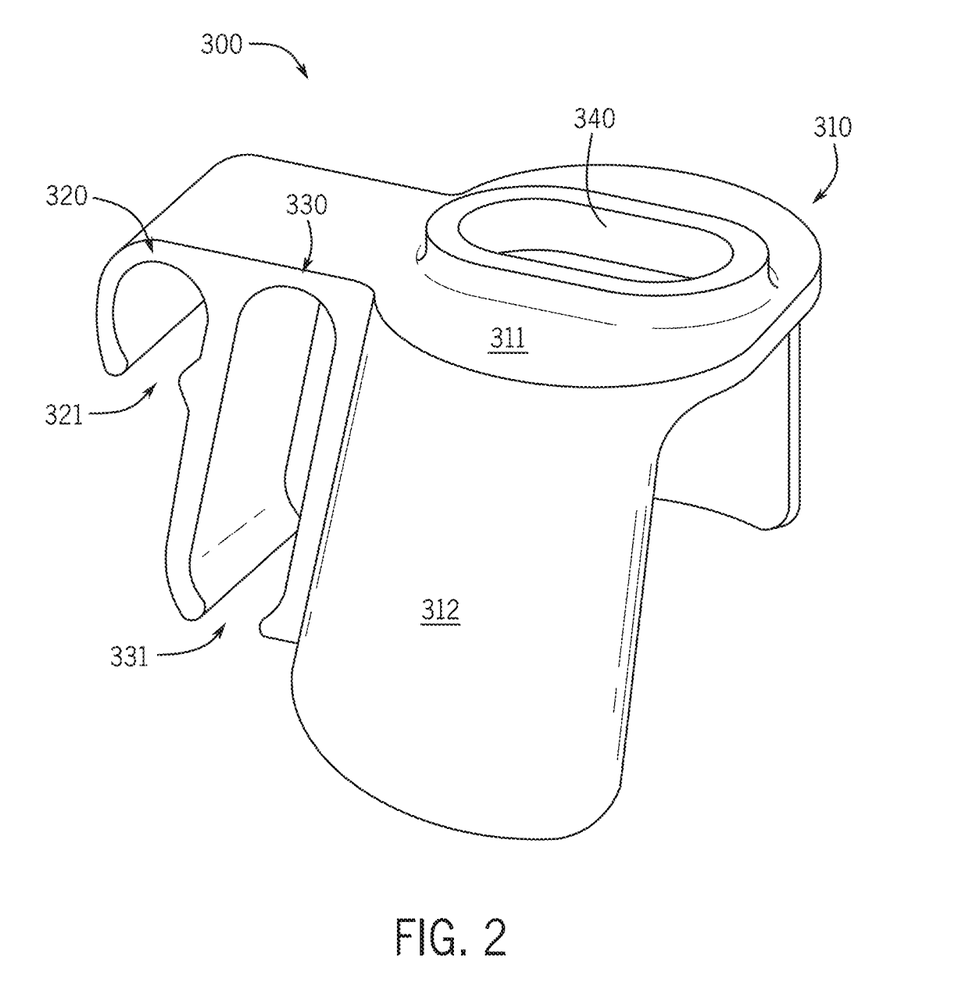
FIG. 2 illustrates a perspective view of a management device according to an exemplary embodiment of the present disclosure.

Referring generally to FIG. 2, a management device 300 for a toilet accessory is shown. The management device 300 may be a clip having a plurality of independent and separated sections. As illustrated, the separated sections may include a first section 320 (first clip section) for an electrical cable and a section 330 (second clip section) for storing a water hose. The management device 300 supports and secures at least two inputs for the toilet accessory 400. For example, the toilet accessory 400 may be a bidet and the management device 300 may support a water input and an electrical power input to the bidet.

Figure 3:
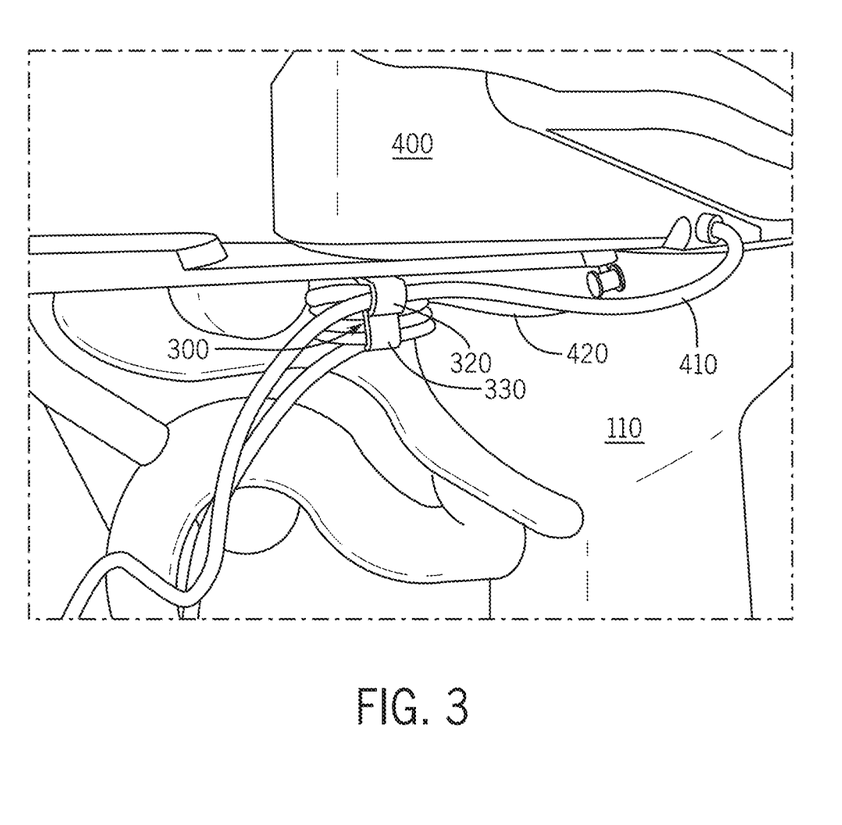
FIG. 3 illustrates a management device for a toilet accessory and a toilet accessory mounted on a toilet according to an exemplary embodiment of the present disclosure.

Referring generally to FIG. 3, a toilet accessory 400 is shown. The toilet accessory 400 may be mounted (e.g., attached, coupled) to the toilet 100 or 200 after the initial installation of the toilet (i.e., the toilet accessory may be an after-market or an add on accessory). In some embodiments, the toilet accessory 400 may be mounted on the base 110 or 210 of the toilet 100 or 200. The toilet accessory 400 may be mounted such that a bottom surface of the toilet accessory 400 resides on a surface of the toilet 100 or 200 that is coplanar with an upper surface of the rim 115. In other embodiments, the toilet accessory 400 may be mounted on the side of the base 110 or 210 of the toilet 100 or 200. Alternatively, the toilet accessory 400 may be mounted on the side of the tank 120 of the toilet 100. In other embodiments, the toilet accessory 400 may be mounted on a wall or other suitable surface near the toilet 100 or 200.

The toilet accessory 400 may be mounted (e.g., secured) to the toilet 100 or 200 directly or indirectly through the seat assembly. In some embodiments, the toilet accessory 400 may be mounted to the toilet 100 or 200 using an adhesive, using fasteners, using clamps, or the like. In some embodiments, the holes may be drilled into the toilet 100 or 200 so that fasteners may be used to secure the toilet accessory 400 to the toilet 100 or 200.

The management device 300 may be mounted on either side of the toilet 100 or 200. The management device 300 may be mounted on the side of the toilet corresponding to the side of the toilet accessory 400 on which the electrical cable 410 and the water 420 are disposed. The management device 300 may be rotated prior to installation on the toilet 100 or 200 to facilitate storage of the electrical cable 410 and water hose 420 on the management device 300.

The toilet accessory 400 may be one of a bidet, a hand sprayer, and the like. The toilet accessory 400 may require inputs of water and electrical power to perform it intended function (e.g., spray water).

In some embodiments, the toilet accessory may be a bidet. A bidet may be mounted on an upper surface of the rim 115 of a toilet and include a toilet seat and/or toilet cover. The bidet may be incorporated with the hinge assembly 135. The bidet includes an electrical power input (e.g., an electrical cable) and a water supply (e.g., a water hose). The bidet may further include a water reservoir, a pump, a hose, and a nozzle. The water supply, water reservoir, pump, and nozzle may be fluidly connected to one another such that water may be provided to the user, sitting on the toilet, to clean the user. The electrical power input may be connected to the pump and configured to supply electrical power to the pump.

The bidet may dispense a stream or jet of water towards the underside of a user. In some embodiments, the bidet may provide a pattern of water to the underside of the user to improve washing. For example, a series of pulses of water may be applied to the underside of a user. The bidet may further include a wand extending from the bidet into the bowl 111 of the toilet. The wand may include the nozzle and extend into the bowl so that water is sprayer upwards and/or towards the front of a user to clean the user. In some embodiments, the wand may be angled. In some embodiments, the wand may extend and retract within the bowl 111 of the toilet.

In other embodiments, the toilet accessory 400 may be a hand sprayer. The hand sprayer may be mounted on the base 110 and/or tank 120 of the toilet. The hand sprayer may include sprayer portion, a hose connecting the sprayer portion and the base portion, and a base portion including a water reservoir and a pump. The hand sprayer includes an electrical power input (e.g., an electrical cable) and a water supply (e.g., a water supply hose). The water supply hose, water reservoir, pump, water hose, and sprayer portion may all be fluidly connected such that water may be sprayed from a nozzle on the sprayer portion. The electrical cable may be connected to the pump and configured to supply electrical power to the pump.

The sprayer portion may further include a button, trigger, lever, or the like for controlling a stream or spray of water from a nozzle on the sprayer portion of the hand sprayer. In some embodiments, one or more nozzles configured to provide different sprays may be selectively chosen by rotating a portion of the hand sprayer including the one or more nozzles. The base portion may further include a storage portion in which the sprayer portion may be stored.

FIG. 2 illustrates a perspective view of the management device 300 according to an exemplary embodiment of the present disclosure. The management device 300 includes a body portion 310, a first clip section 320, a second clip section 330. The body portion 310, first clip section 320, and/or second clip section 320 may be one of polyethylene terephthalate, polyethylene, polyvinyl chloride, polypropylene, or polystyrene. The body portion 310, first clip section 320, and/or second clip section 330 may be flexible. The body portion 310, first clip section 320 and/or second clip section 330 may be flexible to facilitate snapping of the electrical cable 410 and/or water hose 420 into the first clip section 320 and/or second clip section 330.

In other embodiments, the management device 300 may not be flexible. In this embodiment, the first clip section 320 and/or the second clip section 330 may include a strap and/or a clip to secure the electrical cable 410 and/or the water hose 420 in the first clip section 320 and/or the second clip section 330 of the management device 300. In these embodiments, the electrical cable 410 and/or the water hose 420 may not snap into the first clip section 320 and/or the second clip section 330 and a strap or clip may be required to secure the electrical cable 410 and the water hose 420.

The body portion 310 may include a mounting surface 311, a storage section 312, and a mounting hole 340. The mounting surface 311 may be a circular or substantially circular planar surface. The mounting surface 311 may include the mounting hole 340. The mounting hole 340 may be located in the center of the mounting surface 311 and is configured to receive one or more fasteners (e.g., bolts, screws, etc.) for mounting the management device 300 to the toilet. The mounting hole 340 may be circular, substantially circular, or any other shape capable of facilitating mounting of management device 300 to the toilet via one or more fasteners.

The storage section 312 may be a wall extending outward from the outer periphery (e.g., circumference) of the mounting surface. The storage section 312 may extend around the entire periphery of the mounting surface 311. The storage section may be substantially perpendicular to the mounting surface 311. The storage section 312 is configured to store a section or portion of a water hose. A water hose may be wrapped around the storage section one or more times, storing the water hose.

The first clip section 320 and the second clip section 330 may be disposed radially outward from the mounting surface 311 and/or the mounting hole 340. The second clip section 330 may be located radially closer to the mounting surface 311 and/or the mounting hole 340 than the first clip section 320. The second clip section 330 may be disposed between the body portion 310 and the first clip section 320. The second clip section 330 may be connected to the body portion 310 via the mounting surface 311 and/or the storage portion 312. The first clip section 320 may be connected to the second clip section 330. The body portion 310, second clip section 330, and first clip section 320 may be integrally formed.

Figure 4:
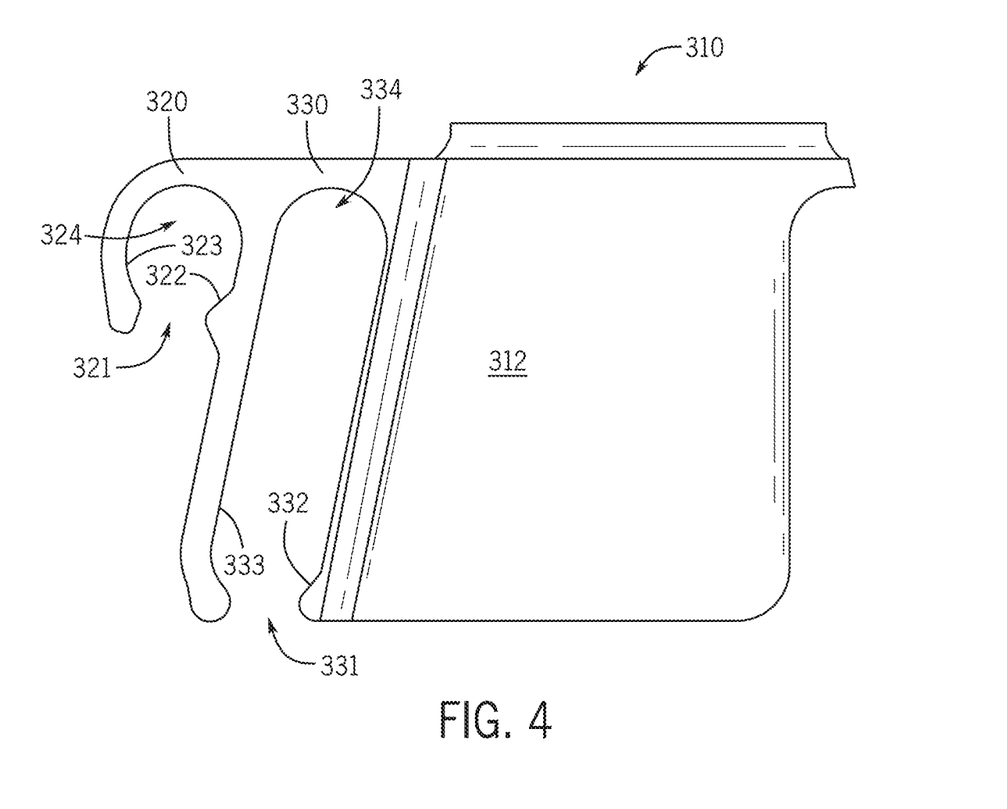
FIG. 4 illustrates a side view of a management device according to an exemplary embodiment of the present disclosure.
Figure 5:
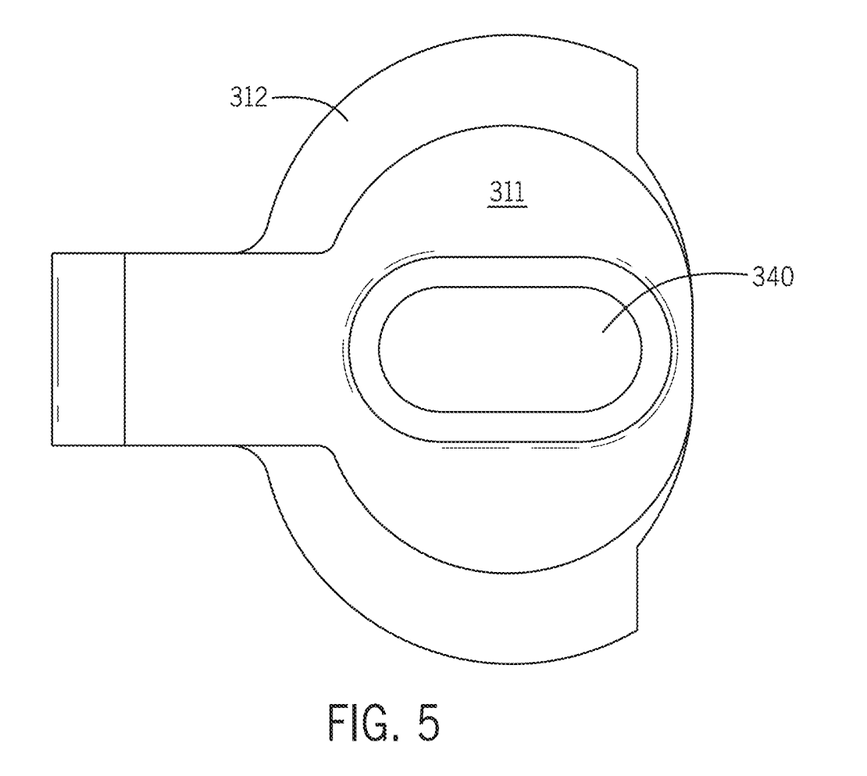
FIG. 5 illustrates a top view of a management device according to an exemplary embodiment of the present disclosure.

Referring to FIGS. 4 and 5, the first clip section 320 includes a first clip opening 321, a first clip inner section 322, a first clip outer section 323, and a first clip circular sector 324 and may be configured to hold or secure an electrical power input for the toilet accessory. The first clip inner section 322 and the first clip outer section 323 may be disposed across from each other and form a first clip circular sector 324 of open space between the first clip inner section 322 and the first clip outer section 323. The first clip circular sector 324 may be more than 240° and less than 360°. The first clip section 320 includes a first clip opening 321 corresponding to the open portion of the first clip circular sector 324. The first clip opening 321 is configured so that an electrical cable may be inserted through the first clip opening 321. The first clip circular sector 324, first clip inner section 322, and the first clip outer section 323 are configured to secure an electrical cable after it has passed through the first clip opening 321. In other words, the first clip is configured such that an electrical cord snaps into place and is held in place by the first clip section 320 after passing through the first clip opening 321. In some embodiments, the first clip circular sector 324 may be an oval, or any other shape suitable to secure an electrical cable after it has passed through the first clip opening 321.

The first clip section 320 may further include a first clip inner radius 324. The first clip inner radius 324 may be a distance from the first clip inner section 322 to the center of the mounting surface 311 and/or mounting hole 340. The first clip section 320 may include a first clip outer radius 325. The first clip outer radius may be a distance from the first clip outer section 323 to the center of the mounting surface 311 and/or mounting hole 340. The first clip inner radius 324 may be shorter than the first clip outer radius 325.

The second clip section 330 includes a second clip opening 331, a second clip inner section 332, a second clip outer section 333, and a second clip storage section 324 and may be configured to hold or secure a water input for the toilet accessory 400. The second clip inner section 332 and the second clip outer section 333 may be disposed across from one another forming the second clip storage section 334 therebetween. The second clip section 330 includes a second clip opening 331 located between the second clip inner portion 332 and the second clip outer portion 333. The second clip opening 331 is configured so that a water hose may pass through the second clip opening 331. The second clip storage section 324, second clip inner portion 332, and second clip outer portion 333 are configured so that a water hose is secured within the second clip storage section 334 after it has passed through the second clip opening 331. In other words, the second clip section 330 is configured so that a water hose snaps into the second clip storage section 334 and is held in place after passing through the second clip opening 331. The second clip storage section 334 may be configured to hold more than one cross section of a water hose (e.g., a water hose may be inserted through the second clip opening 331 multiple times and the storage section 334 may hold the water hose at more than location along the length of the water hose). The second clip portion 330 may be configured to hold a first portion of a water hose.

After a water hose is snapped into the second clip storage section 334, the water hose may be wrapped around the storage portion 312 of the management device 300 before being inserted into the second clip storage portion 334 a second time. In some embodiments, the water hose may be wrapped around the storage portion 312 before being snapped into the second clip storage section 334. This process may be repeated until the second clip storage section 334 is filled or a desired length of a water hose has been stored. Accordingly, the second clip section 330 may be configured to hold a first portion of a water hose and the storage section 312 may be configured to store a second portion of the water hose.

The second clip section 330 may further include a second clip inner radius 334. The second clip inner radius 334 may be a distance from the second clip inner section 332 to the center of the mounting surface 311 and/or mounting hole 340. The second clip section 330 may include a second clip outer radius 335. The second clip outer radius 335 may be a distance from the second clip outer section 333 to the center of the mounting surface 311 and/or the mounting hole 340. The second clip inner radius 334 may be shorter than the second clip outer radius 335.

FIG. 3 illustrates a management device 300 and a toilet accessory 400 mounted on a toilet according to an embodiment of the present disclosure. In the embodiment of FIG. 3, the toilet accessory 400 is a bidet and the toilet accessory 400 is mounted on an upper surface of the rim 115 of a toilet. Further, in the embodiment of FIG. 3, the management device 300 is mounted on the base 110 of the toilet below an upper surface of the rim 115 of the toilet.

As illustrated in FIG. 3, the toilet accessory 400 includes an electrical cable 410 for electrical power input and a water hose 420 for water input to the toilet accessory 400. FIG. 3 illustrates the toilet accessory 400 and the management device 300 after both have been installed on a toilet. As shown in FIG. 3, the electrical cable 410 is secured in the first clip section 320 of the management device 300. The water hose 420 is secured in the second clip section 330 of the management device 300. The water hose 420 is secured in the second clip section 330 at multiple positions along the length of the water hose 420 (e.g., the water hose is inserted into the second clip section 330 multiple times and is secured at multiple locations along the length of the water hose). The toilet accessory 400 and management device 300 may be mounted on both of a toilet including a tank toilet 100 and/or a tankless toilet 200.

Figure 6:
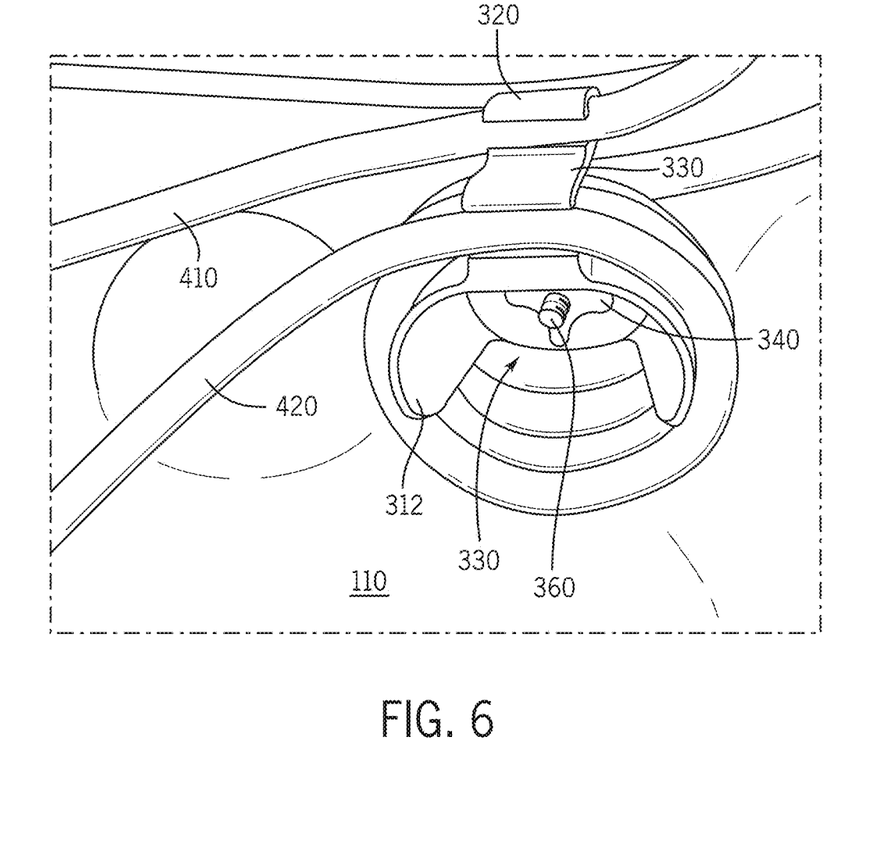
FIG. 6 illustrates an enlarged view of a management device mounted on a toilet according to an exemplary embodiment of the present disclosure.

As illustrated in FIG. 6, the management device 300 is mounted to the base 110 of the toilet. The management device 300 is secured to the toilet using a fastener 360. The fastener 360 may secure the management device 300 to the toilet through the mounting hole 340. The fastener 360 may be any known fastener including a bolt, screw, nail, and the like. The fastener 360 may include a nut.

As shown in FIG. 6, the electrical cable 410 is secured in the first clip portion 320 of the management device 300. As shown in FIG. 6 the water hose 420 is secured in the second clip portion 330 of the management device 300. The water hose 420 is wrapped around the storage portion 312 and secured by the second clip portion 330 of the management device 300. The water hose 420 is held in place by the second clip portion 330 at multiple locations along the length of the water hose 420. Accordingly, the second clip section 330 is configured to hold a first portion of the water hose 420. The water hose 420 is wrapped around the storage portion 312 of the management device 300 multiple times. Accordingly, the storage portion 312 of the management device may be configured to store a second portion of the water hose 420.

Figure 7:
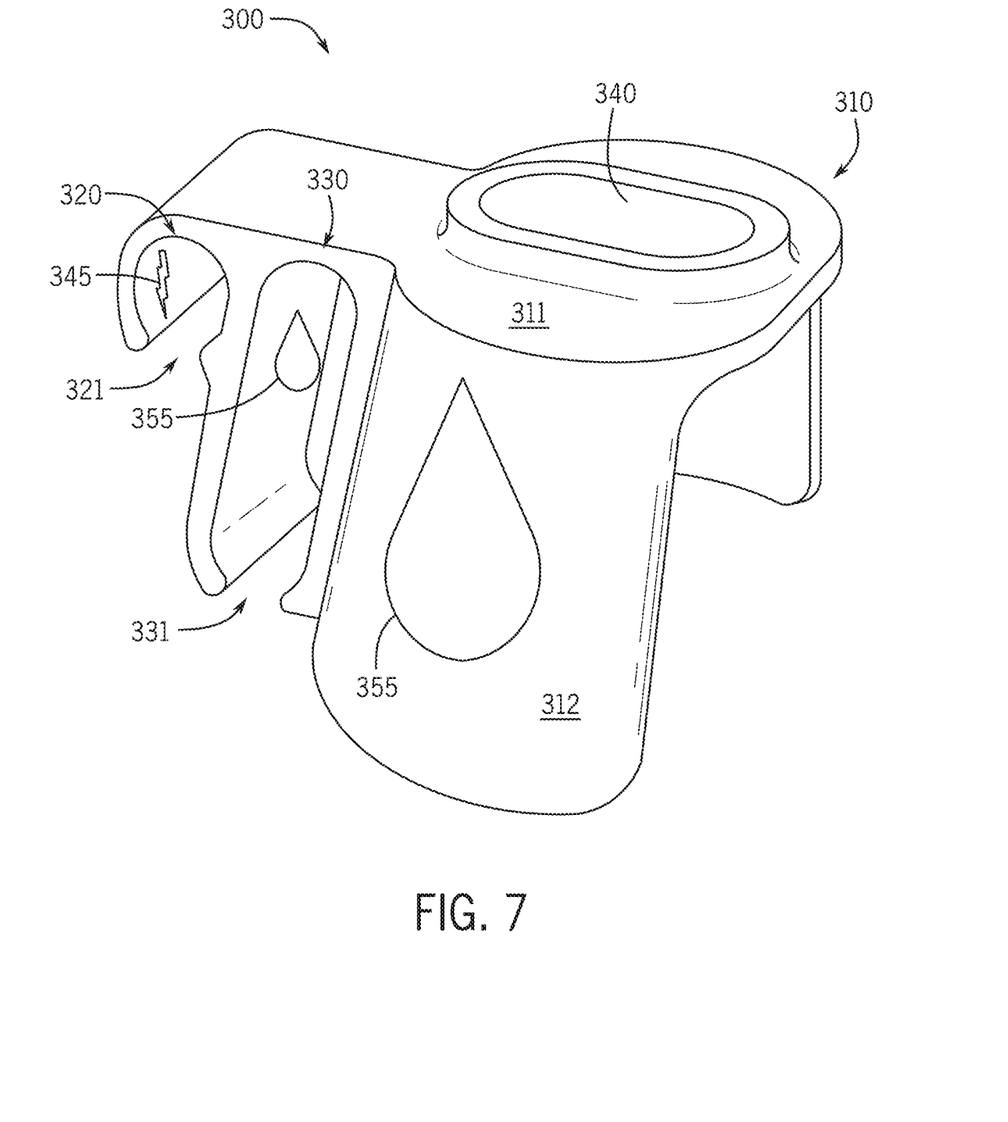
FIG. 7 illustrates a perspective view of a management device according to an exemplary embodiment of the present disclosure.

FIG. 7 illustrates a perspective view of a management device 300 according to an exemplary embodiment of the present disclosure. FIG. 7 includes electrical cable indicia 345 and water hose indicia 355. The indicia may include a symbol (e.g., a drop of water for the water hose indicia 355 and a lightening bolt for the electrical cable indicia 345). The indicia may include a color designation (e.g., blue for the water hose indicia 355 and a yellow or red for the electrical cable indicia 345). The indicia may include a color designation (e.g., the word hose for hose indicia 355 and the word power for the electrical cable indicia 345).

The electrical cable indicia 345 indicates a location where the electrical cable 410 may be held by the water management device 300. An electrical cable 410 may be inserted through the first clip opening 321. After being inserted through the first clip opening 321, the electrical cable 410 may be held in place at the location of the electrical cable indicia 345. The first clip section 320 of the management device 300 may hold the electrical cable 410 in place at the location of the electrical cable indicia. If the management device 300 is mounted on the base 110 of a toilet and is disposed on the bottom side of a surface coplanar to the upper surface of the rim 115 as shown in FIG. 3, the electrical cable 410 may be pushed upward through the first clip opening 321 to be held in place at the location of the electrical cable indicia 345. The electrical cable 410 may be snapped into place after it passes through the first clip opening 321.

The water hose indicia 355 indicates locations where the water hose 420 may be held and stored by the management device 300. A water hose 420 may be inserted through the second clip opening 331 and the water hose may be held in place by the second clip at the location of the water hose indicia 345 located in the second clip 330. The water hose 420 may be wrapped around the storage section 312 of the management device 300 and stored in the location of the water hose indicia 355 located on the storage section 312 of the management device 300. The water hose 420 may be wrapped around the storage section 312 before and/or after being inserted through the second clip opening 331. The water hose 420 may be wrapped around the storage section 312 one or more times. The water hose 420 may be inserted into the second clip opening 331 one or more times. In other words, the water hose 420 may be held in place by the second clip 330 at multiple locations along the length of the water hose 420. The storage section 334 may be large enough to hold more than one cross section of the water hose 420. If the management device 300 is mounted on the underside of an upper surface of the rim 115 as shown in FIG. 3, the water hose 420 may be pushed upward through the second clip opening 331 to be snapped into the storage section 334 of the second clip.

Figure 8:
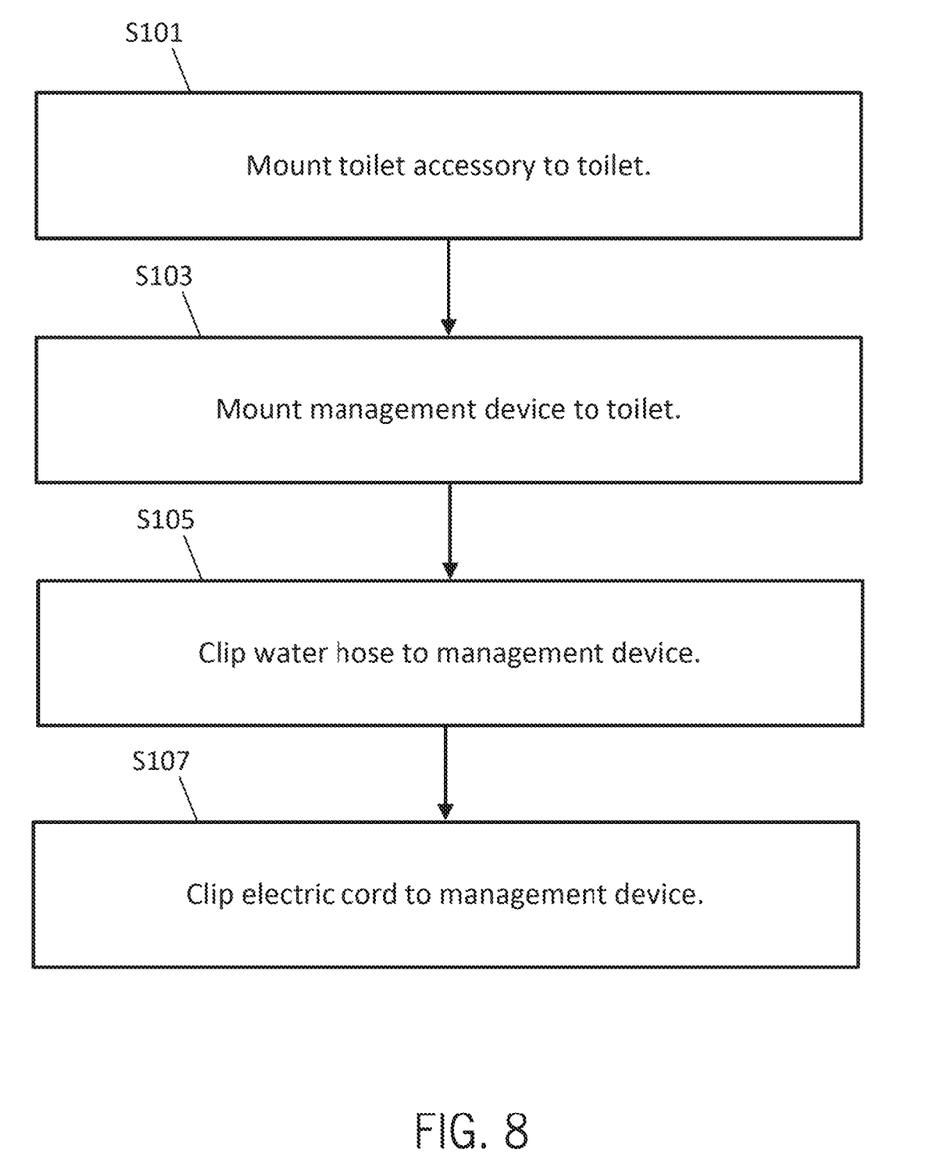
FIG. 8 illustrates a flow chart for installing a management device for a toilet accessory according to an exemplary embodiment of the present disclosure.

FIG. 8 illustrates a flow chart for a method of installing a management device for a toilet accessory according to an embodiment of the present disclosure. The acts of FIG. 8 describe an installation to a toilet that is already installed. The toilet accessory could alternatively be installed previously. Additional, different, or fewer acts may be provided.

At act S101, the toilet accessory 400 is mounted to the toilet. The toilet accessory 400 may be a bidet that connected to the toilet 100 directly or indirectly through the seat assembly 130. The toilet accessory 400 may be a bidet that is connected to the base 110 of the toilet 100 and resides on a surface coplanar to the upper surface of the rim 115 of the toilet 100. The toilet accessory 400 may be a hand sprayer that is connected to the base 110 of the toilet 100, tank 120 of the toilet 100, or a surface proximate to the toilet 100. The toilet accessory 400 may be connected to the toilet 100 through a seat assembly 130, using adhesives, using one or more fasteners, using one or more clamps, or the by the like. In some embodiments, modification of a toilet (e.g., drilling holes in the toilet etc.) may be required for mounting of the toilet accessory 400 on the toilet 100.

At act S103, the management device 300 is mounted to the toilet 100. The management device 300 may be mounted to the base 110 of the toilet 100. The management device 300 may be mounted below an upper surface of the rim 115. The management device 300 may be connected to the toilet 100 using one or more fasteners. The management device 300 may be mounted to the toilet using an adhesive, using one or more fasteners, or using one or more clamps or the like. In some embodiments, a hole may be drilled in the toilet 100 so that a fastener may be used to mount the management device 300 to the toilet. The management device 300 may be connected to the toilet using a nut and screw. The management device may be glued or otherwise secured to the toilet 100.

At act S105, the water hose 420 is connected to the second clip section 330. The water hose 420 may be snapped into the second clip section 330. The water hose 420 may be inserted into the second clip opening 331, such that the water hose 420 is secured in the second clip storage section 334. The water hose 420 may be wrapped around the storage portion 312 of the management device 300. The water hose 420 may be inserted into the second clip portion 330 one or more times and wrapped around the storage portion 312 one or more times.

At act S107, the electrical cable 410 is connected to the first clip section 320. The electrical cable 410 may be snapped into the first clip section 320 of the management device 300. Acts S105 and S107 may be performed in either order or simultaneously or substantially at the same time (e.g., within a certain amount of time).

When a component, device, element, or the like of the present disclosure is described as having a purpose or performing an operation, function, or the like, the component, device, or element should be considered herein as being "configured to" meet that purpose or to perform that operation or function.

The phrases "coupled with" or "coupled to" include directly connected to or indirectly connected through one or more intermediate components. Additional, different, or fewer components may be provided. Additional, different, or fewer components may be included.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. An accessory management device for a toilet accessory, the accessory management device comprising:
   a mounting hole configured to receive a fastener for mounting the accessory management device to a toilet;
   a first clip section configured to hold an electrical cord for supplying power to the toilet accessory;
   a second clip section configured to hold a first portion of a water hose for providing water to the toilet accessory, the second clip section configured to hold the water hose at more than one location along the length of the water hose; and
   a body portion having a mounting surface including the mounting hole and a storage section to store a second portion of the water hose extending from a circumference of the mounting surface.

2. The accessory management device of claim 1, wherein the first clip section and the second clip section are arranged radially outward from the mounting hole with the second clip section being located radially closer to the mounting hole than the first clip section.

3. The accessory management device of claim 1, wherein the storage section is configured so that the water hose may be wrapped around the storage section one or more times.

4. The accessory management device of claim 1, wherein the second clip section is located between the body portion and the first clip section.

5. The accessory management device of claim 1, wherein the first clip section or the second clip section is flexible.

6. The accessory management device of claim 1, wherein the first clip section includes a first clip inner radius and a first clip outer radius, the first clip inner radius and the first clip outer radius being measured from the mounting hole, and the first clip outer radius being longer than the first clip inner radius.

7. The accessory management device of claim 1, wherein the second clip section includes a second clip inner radius and a second clip outer radius, the second clip inner radius and the second clip outer radius being measured from the mounting hole, and the second clip outer radius being longer than the second clip inner radius.

8. The accessory management device of claim 1, wherein the toilet accessory is a bidet.

9. The accessory management device of claim 1, wherein at least one of the body portion, first clip section, and second clip section includes polyethylene terephthalate, polyethylene, polyvinyl chloride, polypropylene, or polystyrene.

10. The accessory management device of claim 1, wherein the storage section extends outwards from and substantially perpendicular to the mounting surface, the storage section configured to store the second portion of the water hose wrapped around the storage section.

11. An accessory management device for a toilet accessory, the accessory management device comprising:
    a body portion having a mounting surface and a storage section, the storage section extending from a circumference of the mounting surface;
    a first clip section configured to hold an electric cord; and
    a second clip section configured to hold a first portion of a water hose, the second clip section configured to hold the water hose at more than one location along the length of the water hose,
    wherein the storage section is configured to store a second portion of a water hose.

12. The accessory management device of claim 11, wherein the first clip section includes a first clip inner radius and a first clip outer radius, the first clip inner radius and the first clip outer radius being measured from a center of the mounting surface, and the first clip outer radius being longer than the first clip inner radius.

13. The accessory management device of claim 11, wherein the second clip section includes a second clip inner radius and a second clip outer radius, the second clip inner radius and the second clip outer radius being measured from a center of the mounting surface, and the second clip outer radius being longer than the second clip inner radius.

14. The accessory management device of claim 11, wherein the toilet accessory includes a sprayer.

15. The accessory management device of claim 11, further comprising:
    a mounting hole located on the mounting surface.

16. A method for installing an accessory management device for a toilet accessory, the method comprising:
    mounting a toilet accessory to a toilet;
    mounting the management device for the toilet accessory;
    clipping a water hose to the management device multiple times such that the management device holds the water hose at more than one location along the length of the water hose;
    wrapping the water hose around a storage section of the management device, the storage section extending from a circumference of a mounting surface of the management device; and
    clipping an electric cord to the management device.

17. The method of claim 16, wherein the management device is mounted to a base of the toilet.

18. The accessory management device of claim 1, wherein the mounting surface is circular.

19. The accessory management device of claim 11, wherein the mounting surface is circular.

20. The method of claim 16, wherein the mounting surface is circular.

* * * * *